United States Patent
Shekh-Yusef et al.

(10) Patent No.: US 11,381,558 B2
(45) Date of Patent: Jul. 5, 2022

(54) BLOCKCHAIN-BASED DEVICE ENROLLMENT SERVICE

(71) Applicant: Avaya Inc., Santa Clara, CA (US)

(72) Inventors: Rifaat Shekh-Yusef, Ottawa (CA); John A. Young, Buntingford (GB)

(73) Assignee: Avaya Inc., Santa Clara, CA (US)

( * ) Notice: Subject to any disclaimer, the term of this patent is extended or adjusted under 35 U.S.C. 154(b) by 262 days.

(21) Appl. No.: 16/656,738

(22) Filed: Oct. 18, 2019

(65) Prior Publication Data

US 2021/0119994 A1    Apr. 22, 2021

(51) Int. Cl.
*H04L 9/40* (2022.01)
*G06F 16/245* (2019.01)
*G06F 16/23* (2019.01)

(52) U.S. Cl.
CPC ...... *H04L 63/0876* (2013.01); *G06F 16/2379* (2019.01); *G06F 16/245* (2019.01); *H04L 63/102* (2013.01)

(58) Field of Classification Search
CPC . H04L 63/0876; H04L 63/102; G06F 16/245; G06F 16/2379
See application file for complete search history.

(56) References Cited

U.S. PATENT DOCUMENTS

| | | |
|---|---|---|
| 10,057,243 B1 | 8/2018 | Kumar et al. |
| 10,412,575 B2 | 9/2019 | Polehn et al. |
| 2018/0254898 A1* | 9/2018 | Sprague .................... H04L 9/30 |
| 2018/0288035 A1* | 10/2018 | Shekh-Yusef ......... H04L 63/123 |
| 2019/0303942 A1* | 10/2019 | Balaraman ......... G06Q 20/4016 |
| 2019/0334904 A1* | 10/2019 | Lelcuk ................ H04L 63/1441 |
| 2019/0386969 A1* | 12/2019 | Verzun .................. H04L 63/102 |

OTHER PUBLICATIONS

Alexandre, Ana; "Verizon Awarded Patent for Blockchain-Based Virtual SIM Cards;" Sep. 20, 2019 retrieved Sep. 23, 2019 from https://cointelegraph.com/news/verizon-awarded-patent-for-blockchain-based-virtual-sim-cards.
Guin, Ujjwal et al.; "Ensuring Proof-of-Authenticity of IoT Edge Devices using Blockchain Technology;" 2018 Department of Electrical and Computer Engineering, Auburn University.
Chinchilla, Chris; "A Next-Generation Smart Contract and Decentralized Application Platform;" Internet White Paper; Jun. 2019; https://github.com/ethereum/wiki/wiki/White-Paper.
Hardjono, Thomas et al.; "Cloud-Based Commissioning of Constrained Devices using Permissioned Blockchains;" May 2016; Proceedings of ACM IoT Privacy, Trust & Security—IoTPTS 2016; Xi'an, China.

* cited by examiner

*Primary Examiner* — Khoi V Le
(74) *Attorney, Agent, or Firm* — Stevens & Showalter LLP (57) ABSTRACT

Providing a blockchain device enrollment service includes creating an enrollment smart contract that controls access to a service by the device; creating a pools smart contract associated with managing a plurality of different endpoints, wherein the pools smart contract is registered with the enrollment smart contract; registering and configuring a manufacturer smart contract with the enrollment smart contract; and registering and configuring a service provider smart contract with the enrollment smart contract.

18 Claims, 8 Drawing Sheets

BLOCKCHAIN-BASED DEVICE ENROLLMENT SERVICE

BACKGROUND

The invention relates generally to systems and methods for telecommunication components and methods and more particularly to adding trusted nodes.

In the prior art, the way that endpoints are deployed securely and sent to the customer is through a third-party reseller. Resellers sell endpoints, from the factory, that are not specific to a particular customer. The third-party creates a staging area, loads certificates, configures the endpoints specifically for a particular customer, and sends the endpoints to the customer. The third-party makes it possible for customers to be able to securely deploy endpoints by simply plugging them in to a network where the phone then self-registers. It is often inefficient to have an intermediary and a staging area to set up endpoints, however, shipping endpoints directly to customers, where the endpoints then configure themselves, creates security vulnerabilities.

BRIEF SUMMARY

Embodiments of the present invention relate to a method for providing a blockchain device enrollment service that includes creating, by a computer, an enrollment smart contract that controls access to a service by the device; and creating, by the computer, a pools smart contract associated with managing a plurality of different endpoints, wherein the pools smart contract is registered with the enrollment smart contract. The method also includes registering and configuring, by the computer, a manufacturer smart contract with the enrollment smart contract; and registering and configuring, by the computer, a service provider smart contract with the enrollment smart contract.

Other embodiments of the present invention relate to a system for providing a blockchain device enrollment service that includes a memory storing executable instructions and a processor in communication with the memory. In particular, the processor when executing the executable instructions is configured to: create an enrollment smart contract that controls access to a service by the device; create a pools smart contract associated with managing a plurality of different endpoints, wherein the pools smart contract is registered with the enrollment smart contract; register and configure a manufacturer smart contract with the enrollment smart contract; and register and configure a service provider smart contract with the enrollment smart contract.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein:

FIGS. 4A-7 are ladder diagrams illustrating an example blockchain-based device enrollment system in accordance with the principles of the present disclosure.

DETAILED DESCRIPTION

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "computer-readable medium" and "computer-readable storage medium" as used herein refer to any tangible storage and/or transmission medium that participates in storing and/or providing instructions to a processor for execution. Such a medium may take many forms, including, but not limited to, non-volatile media (e.g., non-volatile random access memory (NVRAM), magnetic disks, and/or optical disks), volatile media (e.g., dynamic memory, such as main memory), and transmission media and may comprise an electronic, magnetic, optical, electromagnetic, infrared, or semiconductor system, apparatus, or device, or any combination thereof.

The terms "determine," "calculate," "compute," and variations thereof, as used herein, are used interchangeably and may include any type of methodology, process, mathematical operation or technique.

The term "certificate," as used herein, refers to cryptographic digital data files utilized to certify, at least in part, an electronic device. The term, "signature," as used herein, is a data scheme or the result of other algorithmic operation such as to generate a hash, at least in part, from a private key and may be validated using a certificate associated with the private key. At no point does the term "signature" or "certificate," as used herein, refer to the act of a human signing or the presence of a human signature on a physical document.

Figure 1:
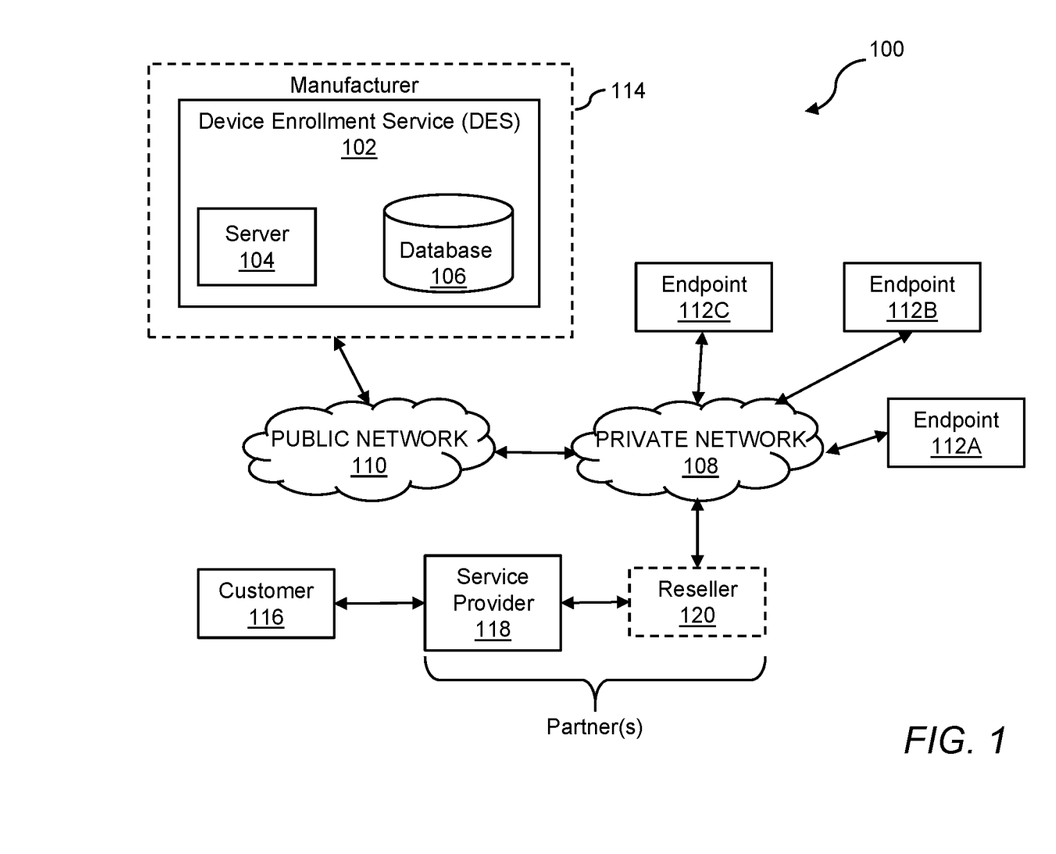
FIG. 1 depicts a system implementing a device enrollment service.

As shown in FIG. 1, a recently developed system 100 for configuring and authenticating devices comprises a Device Enrollment Service (DES) 102. The structure and operation of system 100 is explained in greater detail in U.S. Patent Application Publication No. 2018/0288035 (assigned to applicant), which is hereby incorporated by reference in its entirety. DES 102 may comprise a server 104 in communication with one or more processors (not shown) coupled to a database 106. DES 102 may be attached to a private network 108 via a public network 110, as shown in FIG. 1, or directly (not shown) to the private network 108. In some examples, DES 102 may be hosted or controlled by a device manufacturer 114, and in other examples, DES 102 may be a third-party service that is separate from the device manufacturer 114. It is understood that all references to DES 102 made herein are intended to include both configurations of DES 102.

A plurality of endpoints or devices 112A-112C (referred to herein collectively as devices 112) may be attached to the public network 110 and may communicate with other devices 112 attached to the public network 110. The devices 112 may comprise a variety of electronic devices and components that are capable of being connected to a network, e.g., the Internet 110. For example, one or more of the devices 112 may comprise a digital telephone that uses Session Initiation Protocol (SIP) and/or other packet-based protocol; a softphone comprising a digital telephonic component embodied on a computing device, such as a personal computer; a smartphone; and/or another device comprising packet-based communication components. With reference to representative device 112A in FIG. 2, each device 112 comprises a processor 112A-1 in communication with a memory 112A-2 comprising executable instructions stored thereon.

With reference to FIG. 1, DES 102 may comprise multiple interfaces, including an administrator interface that enables an enterprise to manage the services provided by DES 102 and to load the device certificates and associated MAC addresses onto the respective devices 112; a manufacturer interface that enables the manufacturer 114 of the devices 112 to load the certificates to DES 102; a service provider interface that enables service providers 118 to manage a service provider profile on DES 102 and associate the devices 112 to the service provider profile; a reseller interface that enables resellers 120 to associate the devices 112 with the service provider profile; and a device interface, which comprises a programmatic application program interface (API) to enable the devices 112 to be authenticated and redirected to connect to a specific service provider's interface.

During manufacture, the device manufacturer 114 may issue an instruction to each device 112 to generate a certificate. In response to the instruction, each device 112 generates a self-signed certificate, which may include one or more pieces of information specific to the device 112 (e.g., a serial number, a model number, a date of manufacture, a MAC address, a private key, etc.). Generating the self-signed certificate may comprise creating a hash of the certificate, such as using SHA256 or other hashing algorithm. The hash of the certificate is then provided to DES 102, along with one or more unique identifiers for each device 112, such as the MAC address, serial number, etc. DES 102 stores this information, e.g., in database 106, in a record associated with each device 112 for later use in authenticating the devices 112.

A customer 116 may request a device, e.g., device 112A. The service provider 118 may directly supply the device 112A or may optionally utilize a reseller 120, in which case the service provider 118 may forward the customer's request to the reseller 120. The service provider 118 and/or reseller 120 sends one or more messages to DES 102. The message(s) may comprise a unique identifier for the device 112A (e.g., a MAC address, serial number, etc.) and/or other identifier (such as an enrollment code) that allows DES 102 to associate the device 112A with a respective one of the service provider 118 or the reseller 120. The message(s) may also comprise instructions to associate the device 112A with the customer 116 or a customer site. The device 112A is then delivered or otherwise made available to the customer 116. In other examples, the customer 116 may request the device 112A directly from the manufacturer 114, in which case the manufacturer 114 associates the device 112A with the customer 116 and ships or otherwise makes the device 112A available to the customer.

When the device 112A is booted-up for the first time and attempts to connect to a network of the customer 116, the device 112A is not trusted and may have limited functionality, e.g., the device 112A may have the capacity only to communicate with those components needed to authorize and/or authenticate the device 112A. Following boot-up, the device 112A (via the executable instructions stored in the memory 112A-2 of the device 112A) initiates a secure communication with DES 102. For example, a mutually authenticated communications channel may be established when the device 112A transmits a hash of its self-signed certificate to DES 102. The device 112A may also transmit a request to DES 102 to receive configuration information, such as an address of a provisioning server (not shown). DES 102 verifies that the hash of the certificate matches the stored hash associated with the device 112A, i.e., the device 112A is known to DES 102. DES 102 then transmits a DES-signed certificate and the address of the provisioning server, if requested. Using the DES-signed certificate, the device 112A obtains the necessary configuration information from the provisioning server. The device 112A also presents the DES-signed certificate to a service provider (not shown) associated with the customer's network, which validates the certificate and adds the device 112A to a list of trusted devices that are allowed to utilize the customer's network.

The operation of the DES system is described briefly below to provide a reference of what analogous functions are accomplished in accordance with the present disclosure of a blockchain-based DES.

The above-incorporated patent application describes systems and methods that provide a direct-to-customer solution that allows for the secure configuration, authentication, and registration of endpoints from a customer site. In one embodiment, an endpoint may be a digital telephone, such as utilizing Session Initiation Protocol (SIP) and/or other packet-based protocol, softphone (e.g., digital telephonic component embodied on a computing device, such as a personal computer), smartphone, and/or other device comprising packet-based communication components. In another embodiment, endpoints are limited to physical devices (e.g., telephones) that may be physically provided to a location for use via attachment to a location-specific network or network portion. Endpoints may utilize additional or alternative forms of digital media communication, such as video, chat, email, co-browse, etc. Endpoints may also incorporate other features, such as analog telephony, computing components, etc.

In one embodiment, a Device Enrollment Service (DES) is described that may be deployed on a private and/or public network (e.g., the Internet). The DES may have multiple interfaces, including one or more of, but not limited to: an Administrator interface, to enable an enterprise to manage the services provided by the DES and to load the endpoint certificates, with their associated media access control address (MAC address), onto endpoints; a Manufacturer interface, to enable a manufacturer of the endpoint to load the certificates to the DES; a Service Provider (SP) interface, to enable the service provider to manage the service provider's own profile on the DES and associate endpoints to the service provider's profile; a Reseller interface, to enable resellers to associate endpoints with their reseller's profile; and an Endpoints interface, a programmatic application program interface (API) to enable endpoints to be authenticated and redirected to connect to a specific service provider's interface.

This type of DES can include tests/commands that are introduced to perform one or more of: Create a self-signed certificate on an endpoint; Fetch a hash of the self-signed certificate, store the hash in a database (DB), and associate the hash with an individual endpoint's MAC address. Furthermore, these hashes, and their associated MAC addresses, may then be uploaded to the DES, such as one or more DES servers.

Conventionally, service providers (SP) update their profile on the DES system to allow resellers to associate endpoints with the reseller's profile. The service provider profile includes one or more, and preferably each, of: a provisioning URL(s); and a Certificate Authority (CA) certificate to validate the provisioning server certificate, when the certificate is not signed by a public CA trusted by the endpoint. The reseller may associate a list of endpoints with a specific SP by associating the MAC addresses of each of the endpoints with the SP profile.

As described in the above-referenced patent application, when a self-signed certificate expires or is compromised, the DES will remove the certificate from the DES DB, and a new locally generated self-signed certificate is then associated with the DES using the Access Key mechanism that securely introduces the certificate to the DES.

The DES can create service provide (SP) profiles. For example, an SP can log into their account and create an SP profile to allow the DES to redirect endpoints to the Service Provider Provisioning service. The SP profile includes a sp-validation-key-pair, created by DES, with the sp-validation-private-key maintained on the DES and the sp-validation-public-key maintained by the Service Provider, to later allow the Service Provider to validate signed requests from the DES. The profile may also include a sp-profile-key-pair, created by the SP, with the sp-profile-private-key maintained by the Service Provider and the sp-profile-public-key maintained on the DES, to later allow the DES to validate signed requests from the SP. In one implementation, every change/update to the profile by the SP must be signed with their sp-profile-private-key. When the SP sells a service to a customer, and the customer orders endpoints from a reseller, the SP updates their profile to later allow the reseller to associate endpoints with the reseller's profile for a specific customer. When a SP directly sells an endpoint to a customer, the SP updates the SP's profile to associate the endpoints with the customer domain.

One particular benefit of using key-pairs instead of Public Key Infrastructure (PKI) certificate is to avoid the need for the PKI infrastructure and its complexities. However, in another embodiment, PKI certificates may be utilized. As for resellers, an enterprise can create an account for a reseller to login to and associate endpoints with particular SPs. As part of this setup process, the reseller creates a rs-profile-key-pair associated with the reseller; the rs-profile-private-key stays with the reseller, and the rs-profile-public-key is provided to the DES.

In the conventional DES, the endpoints are configured by the manufacturer with a hardcoded list of Public CAs. Optionally, the endpoint may be loaded with new CA certificates to be used instead of, or in addition to, the hardcoded certificates. To prevent an attacker from hijacking the endpoint if, during transition (e.g., shipment of the endpoint to the end customer) the endpoint gets loaded with malicious CA, the endpoint will always prompt the user when the endpoint tries to connect to the DES when the CA used is a non-hardcoded CA. A user must either give the endpoint permission to proceed or erase the non-hardcoded CA. The hardcoded CAs may still be used.

There are risks associated with a successful attack. If an endpoint is attacked, the endpoint may be provided with a CA that points to a malicious configuration server. The endpoint will not reach out to the expected configuration server, and will therefore not be able to obtain software to provide services. The absence of the services may then be detected by an administrator for the endpoint. As a benefit, a non-authorized and/or malicious software masquerading as an endpoint, will not be able to enroll the endpoint with the DES system.

Figure 2:
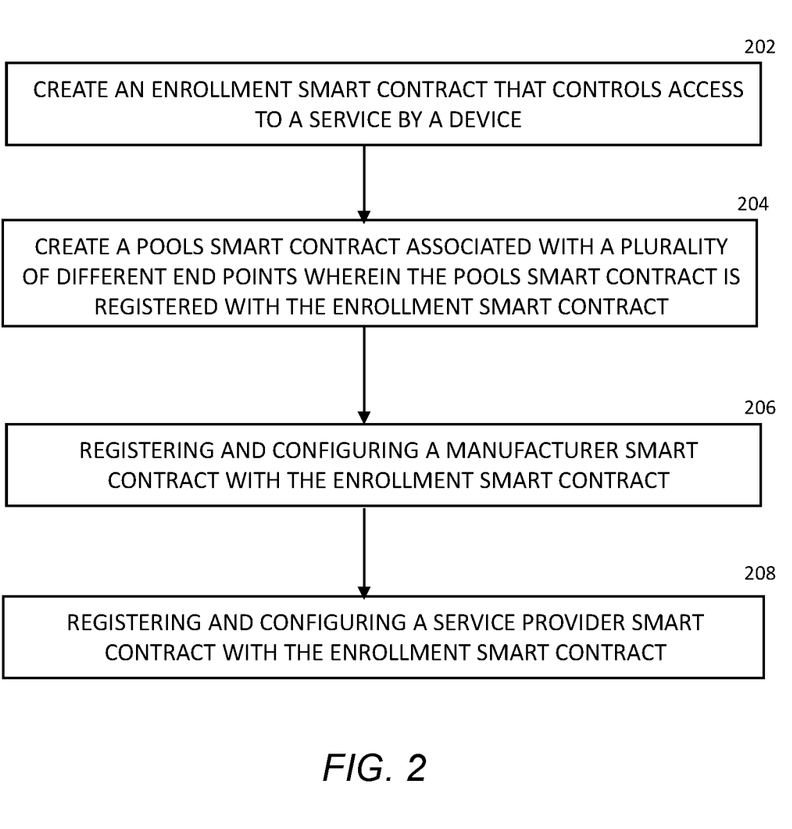
FIG. 2 depicts a flowchart of a blockchain-based method of device enrollment in accordance with the present disclosure.

As mentioned, the present disclosure, in contrast to the conventional DES, relates to systems and methods that are blockchain-based to provide a similar ability to provide the device enrollment service as just described above with reference to FIG. 1. In particular, FIG. 2 provides a general algorithm for implementing a blockchain-based device enrollment service in accordance with the present disclosure. The details explaining the general steps of FIG. 2 are provided below and illustrated in the other figures provided herein. The presently described Blockchain Device Enrollment Service (BDES) solution allows achievement of the same goal of the above-described DES but relies on a Blockchain platform; such as, for example, the Ethereum blockchain platform. While Ethereum is a permissioned blockchain platform, implementation on a public blockchain platform is considered as well. Blockchains can be built that require permission to read the information on the blockchain, that limit the parties who can transact on the blockchain and that set who can serve the network by writing new blocks into the chain. A blockchain developer may choose to make the system of record available for everyone to read, but they may not wish to allow anyone to be a node, serving the network's security, transaction verification or mining. With permissioned blockchains, this may or may not involve 'proof of work' or some other system requirement from the nodes.

The flowchart of FIG. 2 refers to smart contracts that are known to one of ordinary skill in the field of blockchain platforms. In general, in a smart contract approach, an asset or currency is transferred into a program and the program runs this code and at some point it automatically validates a condition and it automatically determines whether the asset should go to one person or back to the other person, or whether it should be immediately refunded to the person who sent it or some combination thereof. In the meantime, the decentralized ledger also stores and replicates the document which gives it a certain security and immutability. Smart contracts and their operation on a permissioned blockchain platform are known to one of ordinary skill in this field and an example explanation is provided at https://github.com/ethereum/wiki/wiki/White-Paper, the contents of which are incorporated herein in their entirety. In the field of blockchain technologies, smart contracts are also referred to as cryptocontracts, digital contracts or self-executing contracts that comprise code that can be automatically executed without participation of intermediaries when certain conditions are met.

As mentioned above, FIG. 2 provides an example flowchart of implementing a BDES in accordance with the principles of the present disclosure. The method of the flowchart can be embodied in software that includes program code or instructions stored in a memory that can be accessed and executed by a processor. More details of the individual steps are provided in describing later figures and within the ladder-diagram text within the figures.

The process begins in step 202 with creation, by a blockchain developer or an Administrative entity, of an enrollment smart contract that controls access to a service by a device or endpoint. In step 204, a pools smart contract is created that is associated with managing a plurality of different endpoints. Furthermore, the pools smart contract is registered with the enrollment smart contract.

Additionally, in step 206, a manufacturer smart contract is associated and configured with the enrollment smart contract; and, lastly, in step 208, a service provider smart contract is registered and configured with the enrollment smart contract.

Creating each contract entails creating, typically using a high-level programming language, code that represents what functions the smart contract can accomplish as well as the conditions or requirements that are to be met in order to execute the smart contract. Typically, a smart contract is executed (e.g., by an Ethereum Virtual Machine (EVM)) as bytecode that can be read and interpreted by the blockchain network. The blockchain is a shared record of the history of transaction such that the nodes store the most recent state of each smart contract in addition to all other transactions. As such a smart contract has details and permissions written in code that require an exact sequence of events to take place to trigger the agreement of terms mentioned in the smart contract. The contract may also include time constraints that can introduce deadlines in the contract. Each contract is embedded in the blockchain making it transparent, immutable, inexpensive and decentralized. Also, every smart contract has its address in the block chain. The smart contract can be interacted with by using its address once the contract has been broadcasted in the network.

A smart contract will also have an Application Binary Interface (ABI) that is typically a list of the contract's functions and argument (e.g., in JSON format) such that an account wishing to use a smart contract's function uses the ABI to hash the function definition so it can create bytecode (e.g., EVM bytecode) required to call the function. This information can be included in a data field of a transaction and interpreted by the EVM with the code at the target account (i.e., the address of the smart contract). Registering a smart contract is accomplished by providing its address and ABI. In the present disclosure, the main smart contract (i.e., the Enrollment smart contract) can be created as well as the Pools and Devices smart contracts. In some embodiments, the Devices smart contract may be a separate smart contract but the purpose and functionality of the Devices smart contract can also be included within the Enrollment smart contract as well. The Pools smart contract (and the Devices smart contract if separate) can be registered with the Enrollment contract by providing their respective connection address and ABI to the Enrollment smart contract. A service provider and reseller can also login to their respective account on the Administrative portal of the blockchain and create their own smart contracts. These contracts can be registered with the Enrollment smart contract by the service provider and the reseller providing the respective address and ABI for each smart contract. From the perspective of the administrative entity, the service provider smart contract and the manufacturer smart contract are each registered with the Enrollment smart contract by the administrative entity associating the address and ABI information from the two contracts with the Enrollment smart contract.

Configuration of a smart contract can also be accomplished by the creator of a smart contract or the administrative entity that manages the Enrollment smart contract. In particular, configuring a smart contact involves ensuring appropriate data types have been initialized as defined in the smart contract which can include initialization of various parameters and setting of initial values. Configuring a smart contract can also include identifying dependencies of other smart contracts (e.g., by name of address) and adding addresses and ABIs of other contracts to a database. Configuring a smart contract can also include identifying or defining an "oracle" which is a means (e.g., another smart contract) for one smart contract to access data from the world outside the blockchain. Thus, using the oracle, a smart contract can take data from the outside world and put it into the blockchain for other smart contracts to consume.

Configuring and registering smart contracts can be accomplished manually by a programmer or developer. However, modern blockchain environments for developing smart contracts include an Integrated Development Environment (IDE) that automates many of the steps of collecting, defining and disseminating the information useful for registering and configuring related smart contracts with one another.

Several benefits can be realized by using blockchain technology for deploying the Blockchain Device Enrollment Service (BDES). For example, it allows increased auditing and transparency of DES transactions amongst all participants within the designated fulfilment chain. The immutable/permanent nature of a blockchain can also provide support for the non-repudiation of DES transactions. The potential also exists to introduce additional forms of automation into the existing DES model through the use of smart contract technology. The use of a permissioned blockchain can enable the necessary levels of privacy that will be required when multiple service providers, manufacturers and resellers are involved.

In general, the description provided below includes a number of distinct actors similar to those described with respect to FIG. 1. There is an enterprise that provides devices to customers. The enterprise, for example, can be AVAYA and is the creator and owner of this service (e.g., BDES) and its associated smart contracts. The enterprise can also be a manufacturer or there can be a separate and distinct manufacturer that is the entity that manufactures devices for the enterprise. There is also the service provider that is the entity (or entities) that provide service for Avaya devices. Customers purchase a device to use it with a service provider and end users are the user that directly interacts with the device.

As mentioned above, smart contracts are essentially self-contained programs that can execute on a blockchain. They are replicated across all nodes on a blockchain and are used for the purpose of executing digital agreements or "contracts" between counterparts on a blockchain. When input data for a smart contract is needed from an external source to the blockchain, an agent known as an "oracle" must be included within the solution. An oracle essentially serves as a single receptor and transmitter of this external data so that all blockchain nodes can receive the same data. Since the blockchain is a consensus-based system, all nodes must execute the same smart contract and have access to the same data in order for a deterministic result to be produced. In the event it is necessary to share the results of a smart contract execution with an external system, an additional agent function must also be supported that can monitor the blockchain status and programmatically share this information with external systems.

The present BDES contemplates an enrollment smart contract that allows the enterprise (e.g., Avaya) to control who gets access to this service. This is a singleton smart contract. There is also a pools smart contract that manages the pools of endpoints, standby pool and available pool, and interfaces with the DB that stores the manufactured devices. This is also a singleton smart contract. A respective manufacturer smart contract is assigned to a specific manufacturer to allow the manufacturer to load devices into the system while a respective service provider smart contract is assigned to each service provider to allow it to control and redirect the device to a specific configuration server. Accordingly, the enterprise (e.g., Avaya) can be the creator of all the smart contracts and administrator of the BDES system. The enterprise would also be the owner of the enrollment smart contract and the pools smart contract. A service provider would be the owner of an assigned service provider smart contract.

Figure 3:
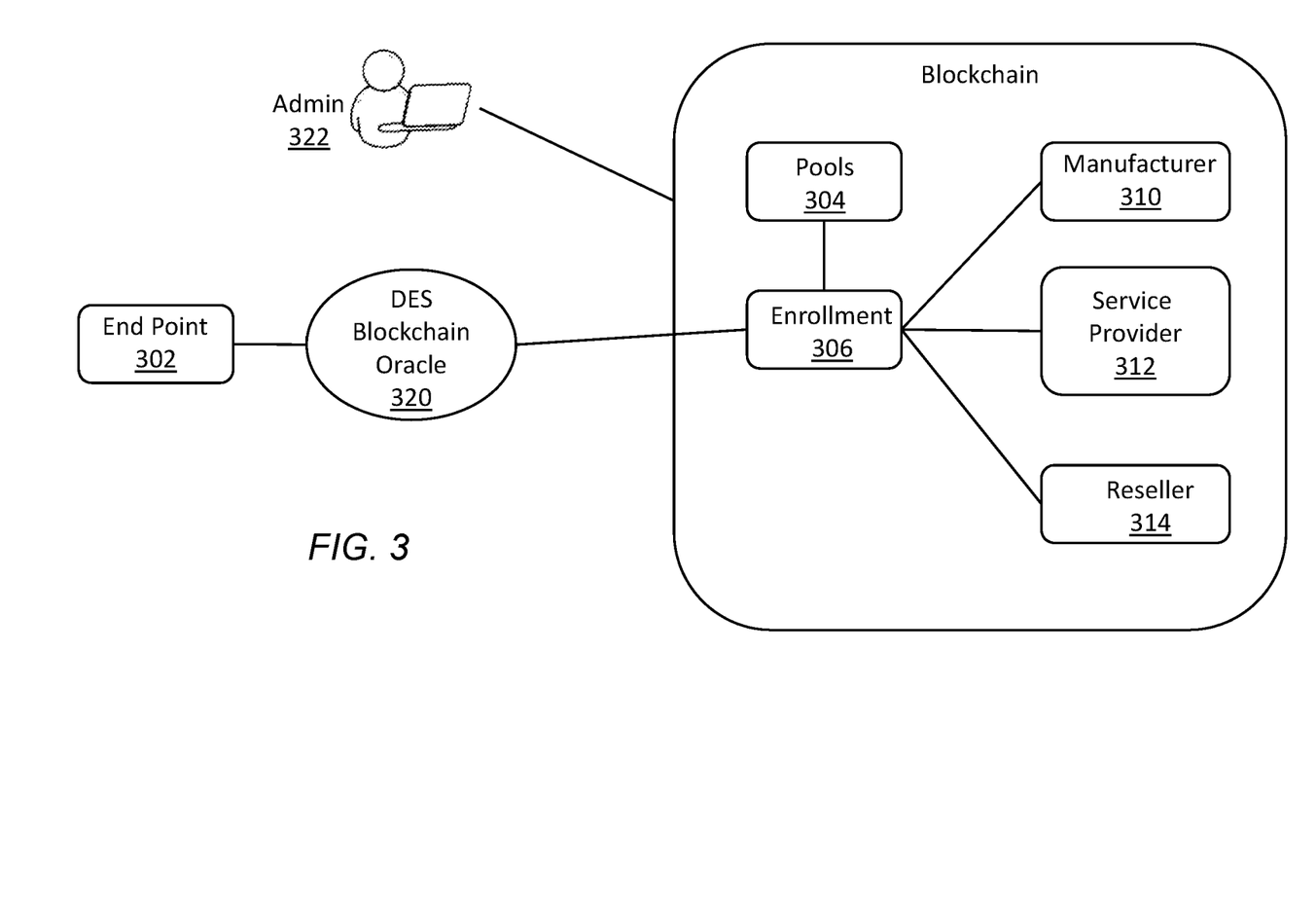
FIG. 3 illustrates a general overview of the various smart contracts in accordance with the principles of the present disclosure.

Thus, in FIG. 3 showing an endpoint 302 and the various smart contracts, the smart contracts 304 and 306 are owned by the enterprise while the other smart contracts 310, 312, 314 are owned by partners of the enterprise. As shown in FIG. 3, a reseller smart contract 314 can be included that allows a reseller partner to distribute endpoints for the enterprise, a DES blockchain oracle 320 can be included as described above, and an Admin Entity 322 can be included to administer the smart contracts and other aspects of the blockchain network within the contemplated BDES.

FIGS. 4A-7 illustrate one implementation of a BDES in accordance with the principles of the present invention. Each step of the ladder diagrams in these figures is labeled with a detailed explanation. For the sake of brevity, these detailed explanations are not repeated verbatim in the description of the figures that follows.

Figure 4A:
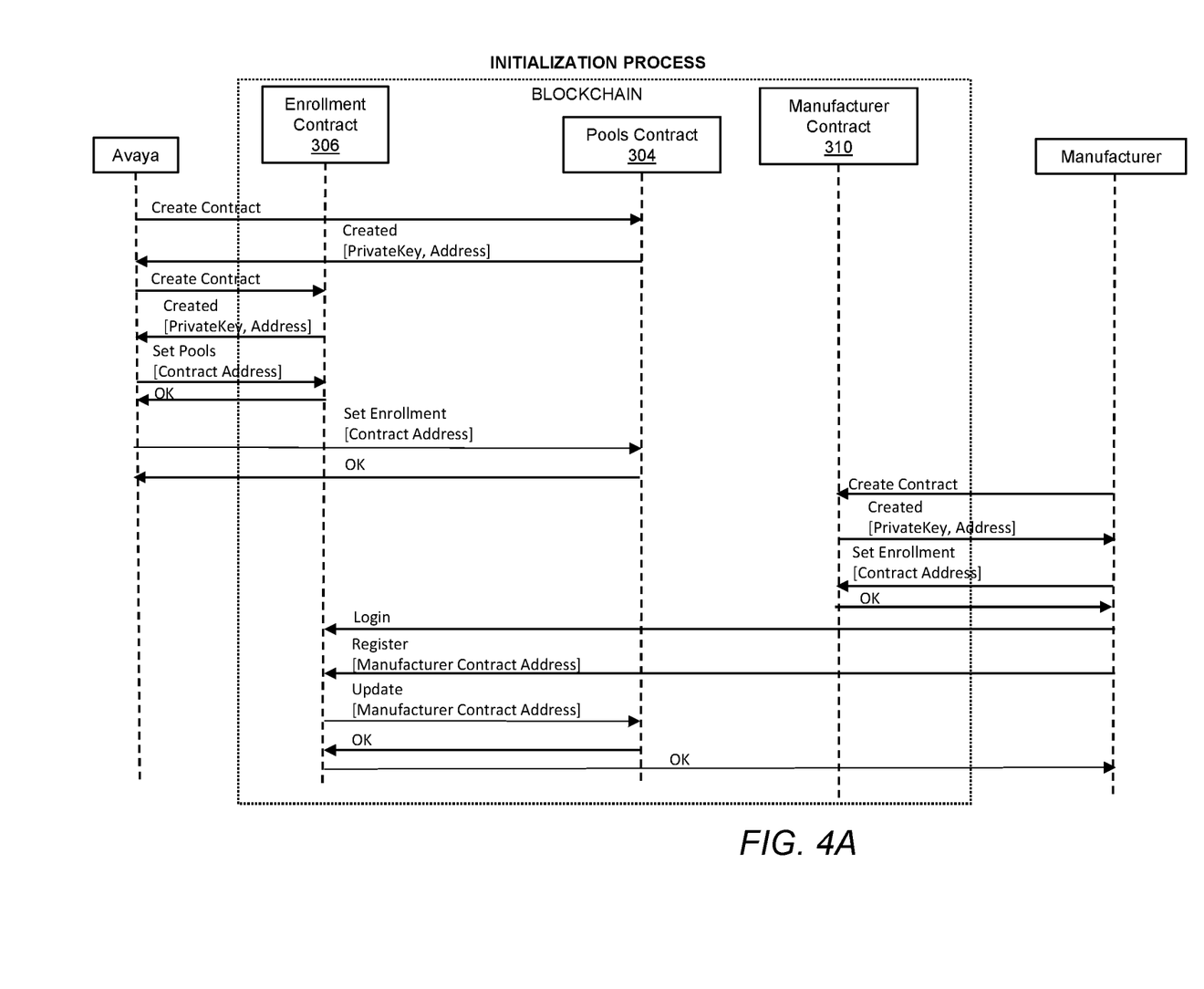

FIG. 4A describes the initial setup of the Blockchain smart contracts. The enterprise (e.g., Avaya) creates the Enrollment smart contract 306 on the Ethereum Blockchain (for example) and makes sure that the Enrollment smart contract address is burned on the device during the manufacturing process. Avaya can also create the Pools smart contract 304 and get its address in order to register and configure the Enrollment contact with the Pools contact, and vice versa.

The manufacturer (or the enterprise) creates a Manufacturer smart contract 310 and configures it with the Enrollment contact. The manufacturer can then login to their account on the Enrollment smart contract 306 and register their Manufacturing smart contract 310 with the Enrollment smart contract 306.

Figure 4B:
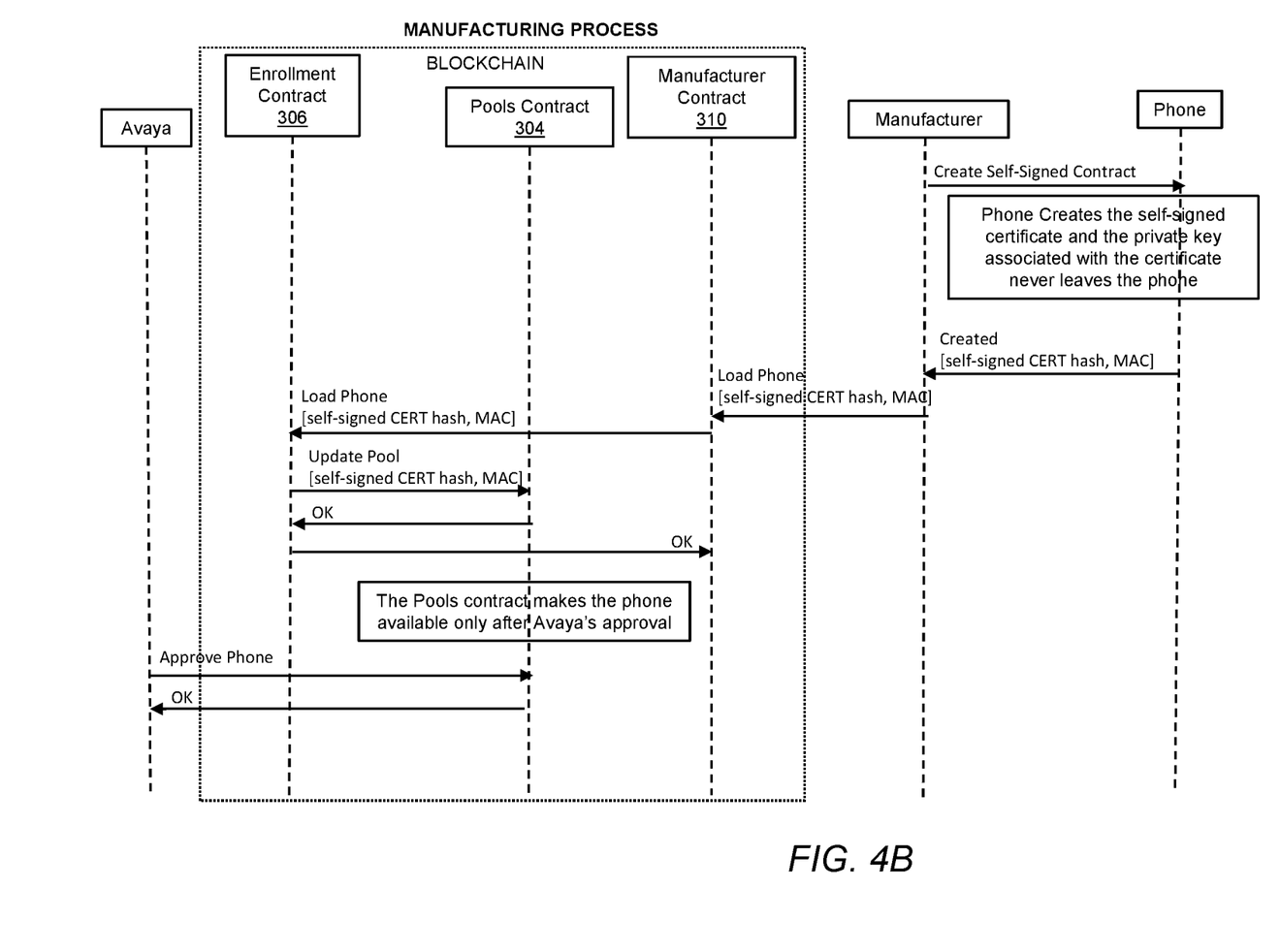

FIG. 4B describes the manufacturing process and the process used to upload the new manufactured device information into the Pools smart contract 304. During the manufacturing process, a new command will be issued by the manufacturer to instruct the phone to create a self-signed certificate with its MAC address as the identity of the certificate. In one embodiment, the private key of this self-signed certificate never leaves the device and is never exposed to any entity including the enterprise.

After that, the manufacturer collects a hash of the self-signed certificate and its MAC address, and other details about the device. The manufacturer then puts the device into production mode, which disables this interface used to create the self-signed certificate. Next, the manufacture uploads the device information into the Pools contract to make it available to the BDES.

Figure 5:
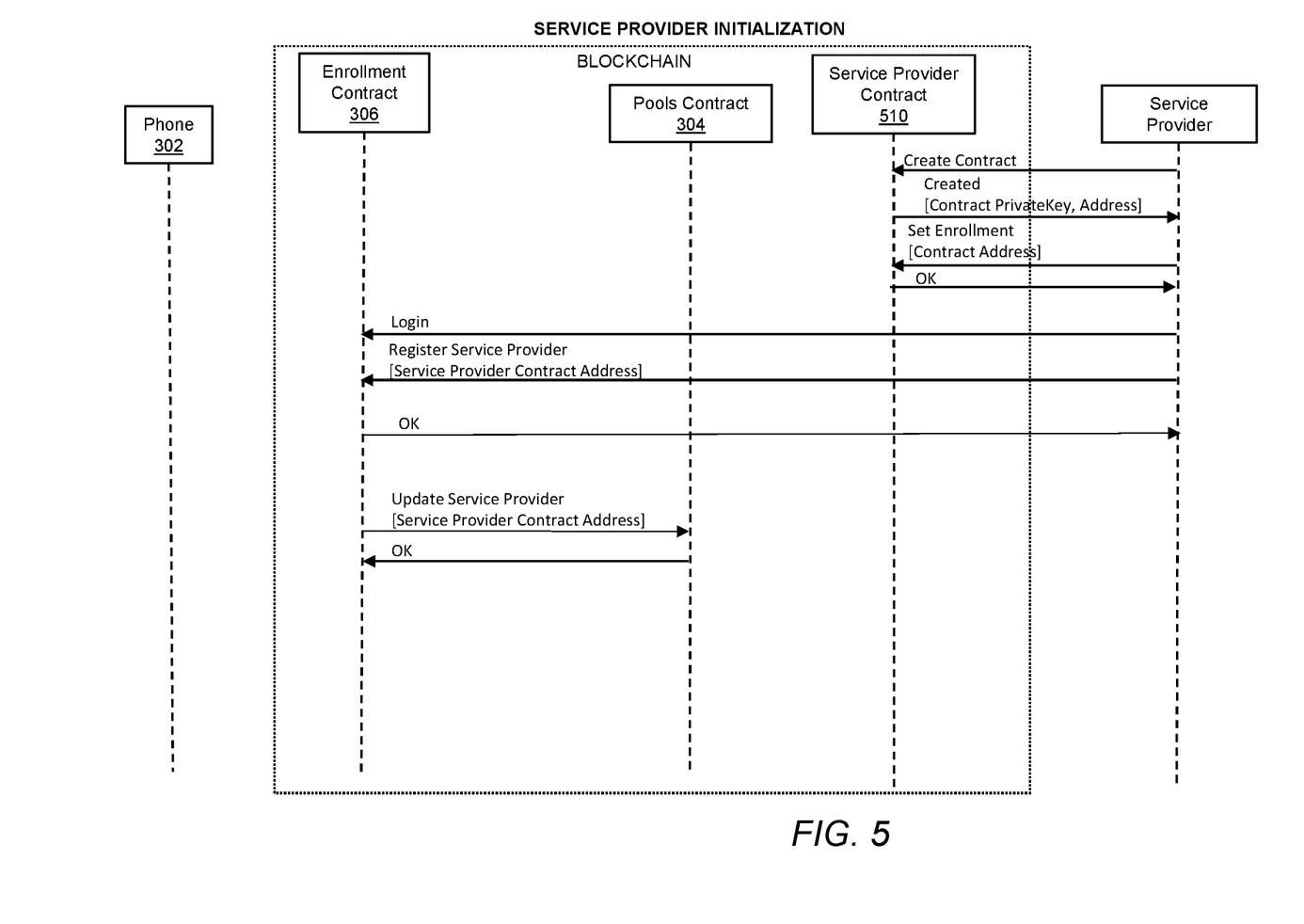

FIG. 5 describes the registration process done by the service provider to get access to the service provided by the Enrollment smart contract 306. The service provider creates a Service Provider smart contract 510 and configures it with the Enrollment smart contract 306. The manufacturer then logins to their account on the Enrollment smart contract 306 and register their Service Provider smart contract 510 with the Enrollment smart contract 306.

When the device 302 is initially uploaded to the Pool, it will be in the Un-Claimed state. For a service provider to get access to a device, the service provider must first claim the device, which moves it to the Claimed state. The service provider can then associate the device 302 with a specific configuration profile for their customer, which moves the device into the Associated state. The service provider must then activate the device 302 to explicitly ask the Enrollment smart contract 306 to provide service for this device 302.

The service provider can move the device 302 back to the Associated or Claimed state at any time. The service provide can also move the device 302 to the UnClaimed state if they no longer own the device 302.

Figure 6:
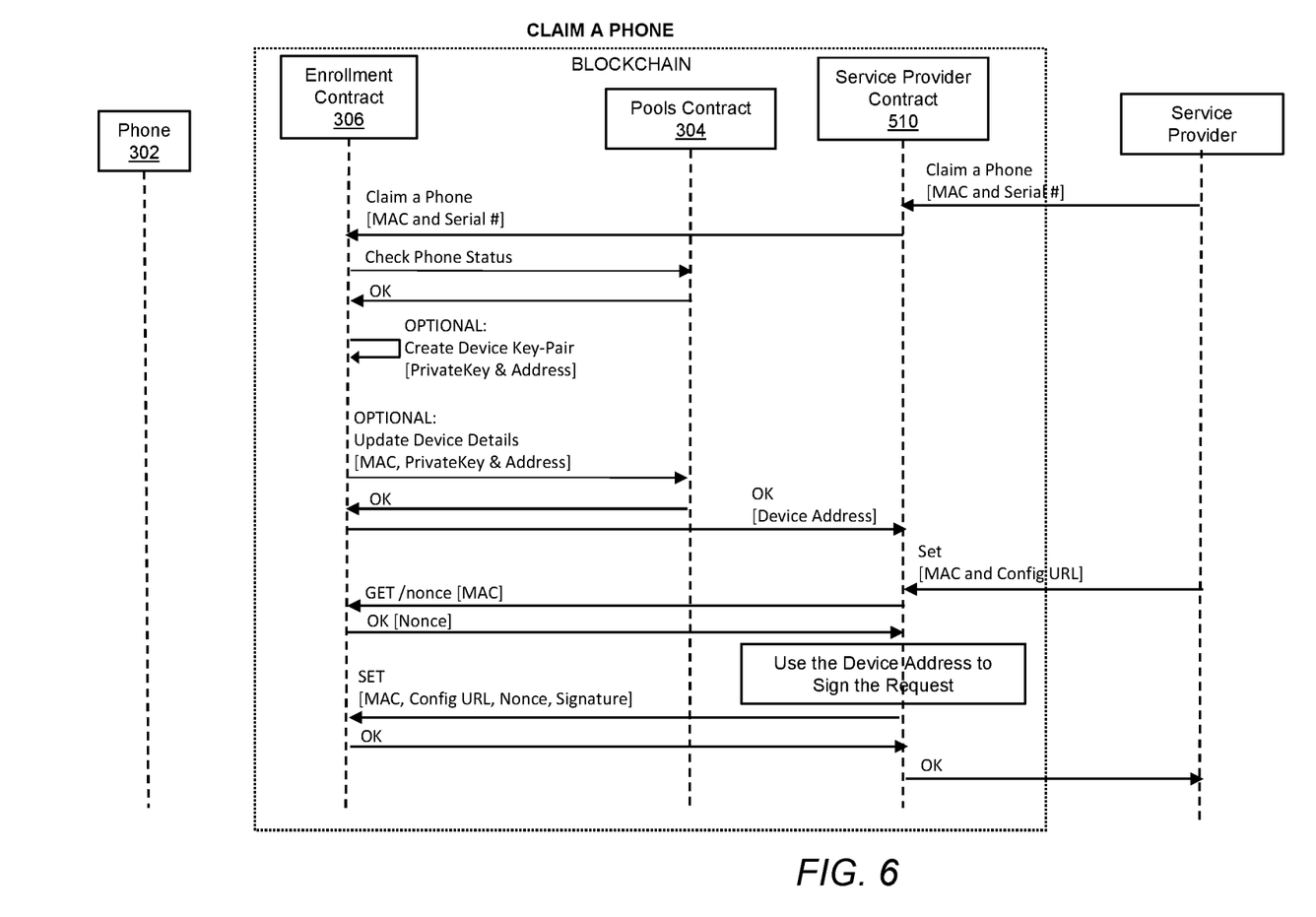

FIG. 6 describes the claiming process done by the service provider. The service provider starts the claiming process by providing its Service Provider smart contract 510 with the MAC and Serial Number of the device 302. The Service Provider smart contract then sends a claim request to the Enrollment smart contract 306.

The Enrollment smart contract 306 queries the Pools smart contract 304 for the device status. The Enrollment smart contract 306 can then create a key-pair and update the Pools smart contract 304 with the new device details, then can return the device public key (Address) to the Service Provider smart contract 510. As shown in FIG. 6, the creation and use of the device -specific key-pair can be optional. For example, as mentioned above, a Device smart contract might be a separate smart contract than the Enrollment smart contract such that it would operate to establish an association between a device and an address. When that functionality is included in, and provided by, the Enrollment smart contract, the corresponding steps in FIG. 6 are not necessarily performed explicitly (as shown by the "optional" label in the figure).

At this stage, the service provider has control over the service provider smart contract 510 and assigns a configuration URL for this device to associate it with a specific customer. As shown in the diagram of FIG. 6, this information can be forwarded to the enrollment smart contract 306 and returned to the service provider smart contract 510.

Figure 7:
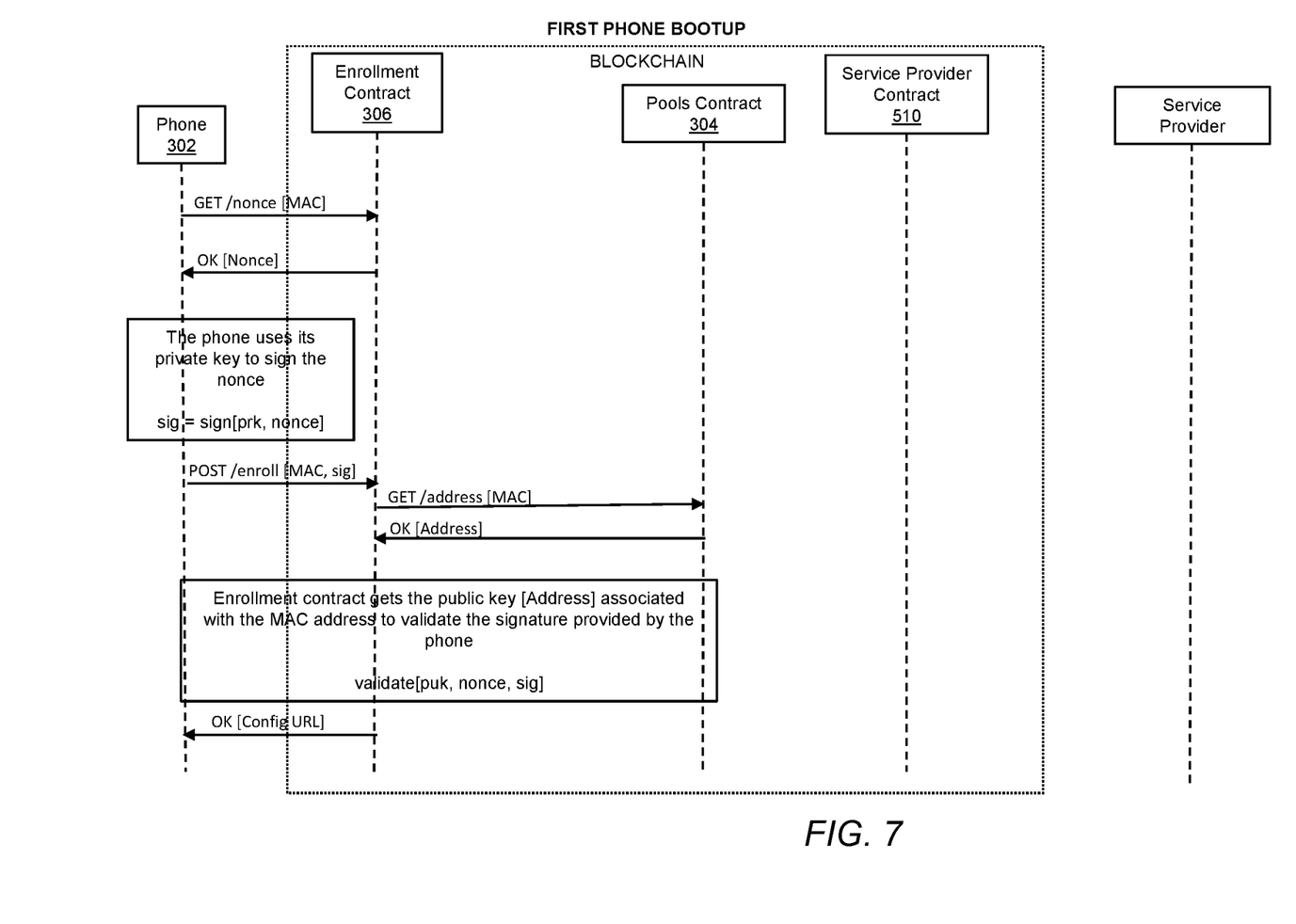

FIG. 7 describes the first boot-up process for the device 302. At first boot-up, the device 302 contacts the Enrollment smart contract 306 and obtains a nonce, and it uses its private key associated with the self-signed certificate to prove to the Enrollment smart contract 306 that it holds the private key associated with its self-signed certificate.

The device 302 then sends an enrollment request with the signature and its MAC address. The Enrollment smart contract 306 then queries the Pools smart contract 304 to get the public key associated with the MAC address and validates the signature provided by the device 302 and responds with the config-url details.

The flowchart(s) and block diagram(s) in the Figures illustrate the architecture, functionality, and operation of possible implementations of systems, methods and computer program products according to various aspects of the present disclosure. In this regard, each block in the flowchart(s) or block diagram(s) may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or by combining software and hardware implementation that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may include, but is not limited to, an electronic, magnetic, optical, electromagnetic, or semiconductor system, apparatus, or device, or any suitable combination thereof. More specific examples may include an electrical connection having one or more wires; a floppy disk; a flexible disk; a hard disk; magnetic tape or any other magnetic medium; a magneto-optical medium; a random access memory (RAM); a read-only memory (ROM); an erasable programmable read-only memory (EPROM or Flash memory); a solid state medium like a memory card, chip, or cartridge; a portable compact disc read-only memory (CD-ROM); an optical storage device; an optical fiber; or any suitable combination thereof. A digital file attachment to email or other self-contained information archive or set of archives may be considered a distribution medium equivalent to a tangible storage medium. When the computer-readable media is configured as a database, it is to be understood that the database may be any type of database, such as relational, hierarchical, object-oriented, and/or the like. In the context of this document, a computer-readable storage medium may be any tangible storage medium or distribution medium and prior art-recognized equivalents and successor media that may contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer-readable medium that when executed may direct a computer, other programmable data processing apparatus, or other devices to function in a particular manner, such that the instructions when stored in the computer-readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined into one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communication devices, at one or more users' premises, or some combination thereof. Similarly, one or more functional portions of the system could be distributed between a telecommunication device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for providing a blockchain device enrollment service comprising:
    creating, by a computer, an enrollment smart contract that controls access to the blockchain device enrollment service on a network by a device;
    creating, by the computer, a pools smart contract associated with managing a plurality of different endpoints, wherein the pools smart contract is registered with the enrollment smart contract;
    registering and configuring a manufacturer smart contract with the enrollment smart contract;
    registering and configuring a service provider smart contract with the enrollment smart contract;
    receiving, from the device, an enrollment request to enroll the device on the network, wherein the enrollment device includes an identification of the device and a signature;
    determining whether the device is allowed access to the network based on a public key associated with the device and the received signature;
    retrieving a configuration uniform resource locator from the pools smart contract based on the identification of the device;
    sending the configuration uniform resource locator to the devices;
    receiving, by the computer, a communication from the device for the enrollment smart contract upon a first-time boot of the device; and
    authenticating, by the computer, the device based on the received communication.

2. The method of claim 1, wherein the blockchain device enrollment service comprises a permissioned blockchain.

3. The method of claim 1, wherein the enrollment smart contract is programmed into the device during manufacture.

4. The method of claim 1, wherein the device is initially in an un-claimed state.

5. The method of claim 1, wherein the identification of the device comprises at least a MAC address of the device.

6. The method of claim 1, comprising:
    receiving, by the computer, a claim request for the device from the service provider smart contract;
    querying, by the computer, from the pools smart contract a status of the device;
    creating, by the computer, credentials for the device; and
    updating, by the computer, the pools smart contract with the credentials for the device.

7. The method of claim 6, comprising:
    returning, by the computer, the credentials to the service provider smart contract.

8. The method of claim 6, wherein the status of the device comprises one of:
    claimed or un-claimed.

9. The method of claim 1, further comprising:
receiving, from the device, a nonce request, wherein the nonce request includes the identification of the device; and
sending a nonce to the device;
wherein: the signature is based on the nonce and a private key associated with the device; and
determining whether the device is allowed access to the network is further based on the nonce.

10. A system for providing a blockchain device enrollment service comprising:
a memory storing executable instructions; and
a processor in communication with the memory, the processor when executing the executable instructions is configured to:
create an enrollment smart contract that controls access to the blockchain device enrollment service by a device;
create a pools smart contract associated with managing a plurality of different endpoints, wherein the pools smart contract is registered with the enrollment smart contract;
register and configure a manufacturer smart contract with the enrollment smart contract;
register and configure a service provider smart contract with the enrollment smart contract;
receive, from the device, an enrollment request to enroll the device on the network, wherein the enrollment request includes an identification of the device and a signature;
determine whether the device is allowed access to the network based on a public key associated with the device and the received signature;
retrieve a configuration uniform resource locator from the pools smart contract based on the identification of the device;
send the configuration uniform resource locator to the device;
receive a communication from the device for the enrollment smart contract upon a first-time boot of the device; and
authenticate the device based on the received communication.

11. The system of claim 10, wherein the blockchain device enrollment service comprises a permissioned blockchain.

12. The system of claim 10, wherein the enrollment smart contract is programmed into the device during manufacture.

13. The system of claim 10, wherein the device is initially in an un-claimed state.

14. The system of claim 10, wherein the identification of the device comprises at least a MAC address of the device.

15. The system of claim 10, wherein the processor when executing the executable instructions is configured to:
receive a claim request for the device from the service provider smart contract;
query the pools smart contract for a status of the device;
create credentials for the device; and
update the pools smart contract with the credentials for the device.

16. The system of claim 15, wherein the processor when executing the executable instructions is configured to:
return the credentials to the service provider smart contract.

17. The system of claim 15, wherein the status of the device comprises one of: claimed or un-claimed.

18. The system of claim 10, wherein the processor when executing the executable instructions is configured to:
receive, from the device, a nonce request, wherein the nonce request includes the identification of the device; and
send a nonce to the device;
wherein: the signature is based on the nonce and a private key associated with the device; and
determining whether the device is allowed access to the network is further based on the nonce.

* * * * *

UNITED STATES PATENT AND TRADEMARK OFFICE
CERTIFICATE OF CORRECTION

| | |
|---|---|
| PATENT NO. | : 11,381,558 B2 |
| APPLICATION NO. | : 16/656738 |
| DATED | : July 5, 2022 |
| INVENTOR(S) | : Rifaat Shekh-Yusef et al. |

It is certified that error appears in the above-identified patent and that said Letters Patent is hereby corrected as shown below:

In the Claims

Column 14, Line 31, In Claim 1, "device includes an identification" should read --request includes an identification--.

Column 14, Line 40, In Claim 1, "devices;" should read --device;--.

Signed and Sealed this
Twenty-seventh Day of June, 2023

*Katherine Kelly Vidal*

Katherine Kelly Vidal
*Director of the United States Patent and Trademark Office*